United States Patent [19]
Hatanaka et al.

[11] 3,756,256
[45] Sept. 4, 1973

[54] AUTOMATIC MONEY DISPENSING MACHINE

[75] Inventors: Yoshihiro Hatanaka; Hideto Shigemori; Hisashi Kitagami, all of Himeji, Japan

[73] Assignee: Glory Kogyo Kabushiki Kaisha, Himeji-shi, Japan

[22] Filed: Dec. 29, 1971

[21] Appl. No.: 213,401

[30] Foreign Application Priority Data
Dec. 29, 1970 Japan.............................. 45/121648
Sept. 30, 1971 Japan............................... 46/75863

[52] U.S. Cl. .................................................. 133/4
[51] Int. Cl. ............................................. G07d 1/00
[58] Field of Search..................................... 133/4, 5

[56] References Cited
UNITED STATES PATENTS
3,099,274  7/1963  Fitzsimons .......................... 133/4 R
3,527,238  9/1970  Stamp.................................. 133/4 R Primary Examiner—Stanley H. Tollberg
Attorney—Holman & Stern

[57] ABSTRACT

Disclosed herein is a driving system adapted to dispense money having a function of dispensing money separately according to monetary kinds and another function of dispensing money in a plurality of monetary kinds with a minimum number of sheets thereof (that is, a function of dispensing money with a minimum number os sheets) and which comprises a money dispensing driving circuit, in which said functions are switched over by depressing only a 10-key means or by depressing both the ten-key means and a monetary kind push button. Furthermore disclosed herein is a money selection control device of an automatic money dispensing device, in which money in monetary kinds corresponding to set-inputs applied to a dispensing money storage section is steadily and successively selected and dispensed in accordance with a predetermined order, the driving operation being achieved by depressing a money dispensing start push button only once.

3 Claims, 3 Drawing Figures

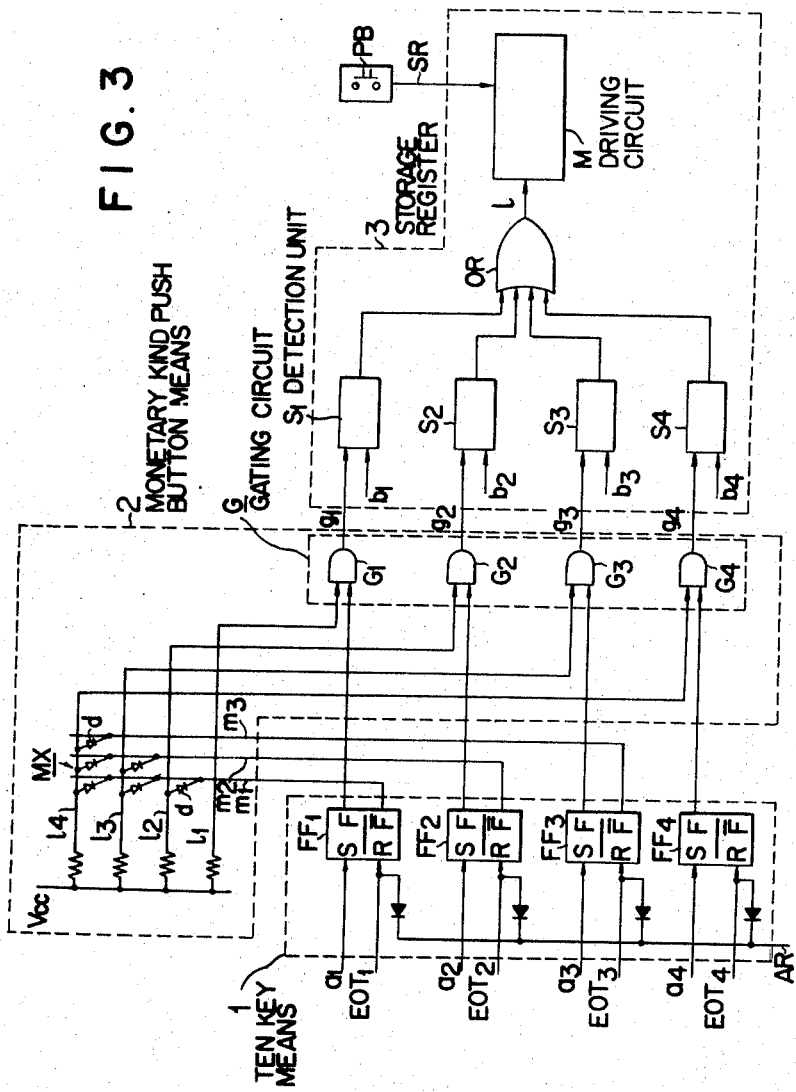

AUTOMATIC MONEY DISPENSING MACHINE

BACKGROUND OF THE INVENTION

The present invention relates to both a money dispensing driving circuit and a money selection control device in an automatic money dispensing machine.

Heretofore, conventional automatic money dispensing machines of this type employ: a system of operating a plurality of money dispensing devices in multiple system; a system in which a plurality of money dispensing sections corresponding to monetary kinds are provided, money in each monetary kind being dispensed from its own money dispensing opening; or a system in which money in monetary kinds to be dispensed out is selected successively by a switching operation, the thus selected money being successively dispensed through one and the same money dispensing mechanism. In this connection, means to automatically operate a money selection control device for the purpose of achieving the last-mentioned system have been proposed, however these conventional means are complicated very much.

SUMMARY OF THE INVENTION

It is accordingly a primary object of the present invention to provide an automatic money dispensing machine simple in construction, which has both a function of dispensing money separately according to monetary kinds and a function of dispensing money with a minimum number of sheets.

Another object of the present invention is to provide an automatic money dispensing machine, in which a money dispensing machine is driven and controlled in accordance with both a method of dispensing money separately according to monetary kinds and a method of dispensing money with a minimum number of sheets thereof, said two functions being changed by depression of a ten-key means only or by depression of both said ten-key means and a monetary kind push button means.

A further object of the present invention is to provide an automatic money dispensing machine comprising a money selection circuit which is simple in construction and is capable of automatically dispensing money in a plurality of monetary kinds.

A still further object of the present invention is to provide an automatic money dispensing machine, in which money in monetary kinds corresponding to set-inputs applied to a money storage section is steadily and successively selected and dispensed in accordance with a predetermined order.

A particular object of the present invention is to provide an automatic money dispensing machine, in which a money dispensing operation is achieved by depressing a money dispensing start push button only once after set-inputs have been applied to a money storage section.

The nature, utility and principle of the present invention will be more clearly understood from the following detailed description when read with reference to the accompanying drawings.

BRIEF DESCRIPTION OF THE DRAWING

In the accompanying drawings:

FIG. 3 is a circuit embodying a money selection device according to the present invention.

DETAILED DESCRIPTION OF THE INVENTION

Figure 1:
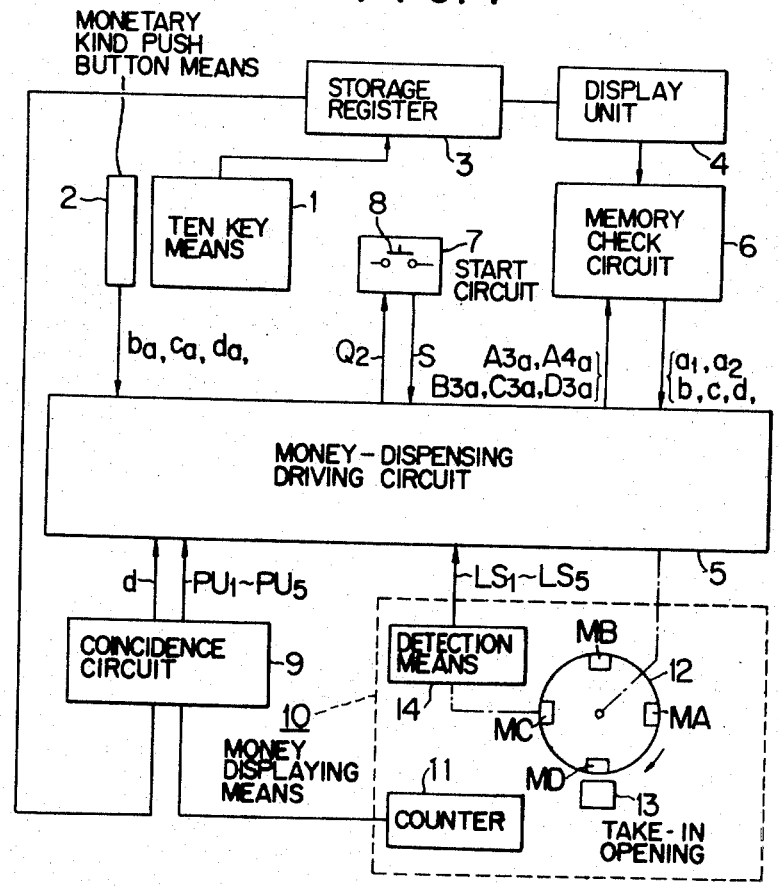
FIG. 1 is a systematic block diagram illustrating an example of an automatic money dispensing machine according to the present invention.

With reference now to FIG. 1, there is shown a paper-money dispensing machine which comprises a 10-key means 1 and a monetary kind push button means 2. In the case when money is dispensed out with a minimum number of sheets thereof, the operation of depressing keys in the 10-key means, which correspond to all the digits of an amount of money to be dispensed, is successively begun with the most significant digit of the money, so that the amount of money to be dispensed is registered in a storage register 3 and displayed on a display unit 4. If once registered, a content displayed on the display unit 4 is not changed at all even if a content in the register 3 is changed.

In the case when money is dispensed separately according to monetary kinds, keys in the 10-key means 1 which correspond to the number of sheets to be dispensed are depressed, and then a push button in the monetary kind push button means 2 which corresponds to one of the monetary kinds, for instance, "10,000", "5,000", "1,000" and "500" is depressed. As a result of which, numerical figures depressed with the 10-key means 1 are shifted four digits higher and displayed on the display unit 4; while a monetary kind signal selected, by depression of the monetary kind button means 2, out of signals $b_a$, $c_a$ and $d_a$ which correspond to, for instance, "5,000", "1,000" and "500", respectively, is applied to a money dispensing driving circuit 5 from the monetary kind push button means 2. For instance, when it is intended to dispense out 55 sheets of 5,000-yen paper moneys, "550,000" is displayed on the display unit 4 and signal $b_a$ is fed to the money dispensing driving circuit. The content displayed on the display unit 4 is detected by a memory check cirucit 6. When the two high digits on display are not "0", that is, the content is "10,000" or more, signals $a_1$ and $a_2$ are applied to the money dispensing driving circuit 5. When there is a numerical figure of "5" or greater on the fourth digit, that is, the content is "5,000" or higher, a memory signal b is fed to the circuit 5. When there is any of figures "1" to "9" on the fourth digit, that is, the content is "1,000" to "9,000", a memory check signal c is fed to the circuit 5. When there is "5" on the third digit, that is, the content is "500", a memory check signal d is supplied to the money dispensing driving circuit 5. The memory check signals $a_1$, $a_2$, b, c and d are reset by reset signals $A_{3a}$, $A_{4a}$, $B_{3a}$, $C_{3a}$, and $D_{3a}$ issued from relays $A_a$, $B_a$, $C_a$ and $D_a$ of the driving circuit 5 when the operation of dispensing money is completed, as will be described later.

When a start switch 8 in a start circuit 7 is depressed or closed, a signals S is produced therefrom, whereby the money dispensing driving circuit 5 is started. As will be described later, the signal S is reset by a reset signal $Q_2$ which is obtained by a relay Q of the driving circuit 5. In addition, other circuits (not shown) than the driving circuit 5 are also started when the signal S is obtained.

Application of the content stored in the storage register 3 to a coincidence circuit 9 is successively begun with the most significant digit of said content, while a count output from a paper-money counter 11 of a paper-money dispensing means is fed to the coincidence circuit 9. When the count output coincides with the content stored in the register 3, momentary coincidence signals PU1 to PU5 are applied to the money dispensing driving circuit 5.

In the case of dispensing money separately according to monetary kinds, the coincidence circuit 9 produces output PU1 to PU5 at the same time, when the content on the two high digits of the register 3 coincides with that of the counter 11. In the case of dispensing money with a minimum number of sheets, the coincidence circuit 9 produces an output PU1 when the content on the two high digits coincides with that of the counter 11. At the same time, the content in the register 3 is shifted one digit higher, and the second digit of the content thus shifted is compared with the content of the counter 11. When the content on the digit is a numerical figure "S" or greater, the circuit 9 issues an output $\alpha$, and when it is a numericaal figure of 4 or less, the circuit 9 issues an output PU2. Similarly for the following operations of the circuit 9, whenever such a coincidence is obtained, said circuit a produces successively outputs PU3, PU4 and PU5 and at the same time the content stored in the register 3 is shifted higher one by one.

The money dispensing means 10 comprises a drum 12 which is driven clockwise by a turret motor TM included in the driving circuit 5. Many sheets of 10,000-yen paper moneys MA, 5,000-yen paper moneys MB, 1,000-yen paper moneys MC and 500-yen paper moneys MD are placed at predetermined positions on the drum 12, respectively. When the paper money of various monetary kinds are moved to a take-out opening by turning of the drum, respectively, detection signals LS1, LS2, LS3 and LS4 are fed to the driving circuit 5 from a detection means 14, respectively. Described above is the outline of the paper-money dispensing machine to which the money-dispensing driving circuit 5 according to the present invention is applied.

With reference again to FIG. 1, each of the signals fed to and fed from the driving circuit 5 is of a signal passing through a contact. In the driving circuit 5 in FIG. 2, these signal contacts are shown as contacts having symols which are suffixed with the same symbols as their respective signals, and similarly the contacts of all the relays are suffixed with respective symbols, in order to explain the operation of the driving circuit 5.

The money dispensing driving circuit 5 comprises: a monetary kind input circuit 20 which has relays $bf$, $cf$ and $df$ corresponding to signal contacts $b_{1a}$, $c_{1a}$ and $d_{1a}$; a monetary kind check circuit 21 which has relays A, B, C and D corresponding to the monetary kinds "10,000", "5,000", "1,000" and "500", respectively; a monetary kind distinction circuit 22 which has relays $Aa$, $Ba$, $Ca$ and $Da$ corresponding to the monetary kinds "10,000", "5,000", "1,000" and "500", respectively; a paper-money take-out circuit 23 which comprises the above-mentioned turret motor TM, a locking solenoid SD for the drum 12 of the money dispensing means 10, a paper-money transferring motor IM, a suction motor and a solenoid valve SM; and a money dispensing driving circuit 24 including a money dispensing motor M of the money dispensing device 10.

First, the case where an amount of money, for instance, 118,500 yen is dispensed according to a method of dispensing money with a minimum number of sheets thereof, will be explained. As described above, "118,500" is fed to the register 3 by means of the 10-key 1 and is displayed on the display unit 4. Therefore, signals $a_1$, $a_2$, $b$, $c$, and $d$ are fed to the circuit 5 from the memory check circuit 6, whereby the contacts $a_{11}$, $a_{21}$, $b_1$, $c_1$ and $d_1$ of the monetary kind check circuit 21 are turned "on".

Under this condition, when a start signal S is issued from the circuit 7 thereby to close a contact $S_1$, the relays A, B, C and D are excited through the contact $S_1$ thereby to maintain their holding conditions. As a result, in the contact $A_1$, $B_1$, $C_1$, and $D_1$ of the take-out circuit 23, their movable contacts C are connected to their normally open contact sides "a" from their normally closed contact sides "b", thereby to form a loop $y_1$ of

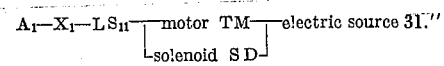

As a result of which, the motor TM and the solenoid SD are excited. In this case, the locking condition of the drum 12 is relieved by the excitation of the solenoid SD, and accordingly the drum 12 is turned round by the motor TM.

This condition is continued until the 10,000-yen paper money MA arrives at the take-in opening 13. Upon arrival of the paper money thereto, a signal $LS_1$ is produced from the detector 14 thereby to switch the contact $LS_{11}$ over to its side "a" from its side "b". Therefore, the loop $y_1$ is switched to a loop Z of "contact $LS_{11}$ — $LS_5$ — relay R — electric source 31", thereby to excite the relay R. As a result of which, the motor IM, suction motor and solenoid valve SM are driven through the contacts $R_1$ and $R_2$ of the realy R, respectively, whereby the 10,000-yen paper moneys are taken out of the money take-out opening 13. At this time, the excitations of the motor TM and solenoid SD are removed, whereby the drum 12 is stopped and locked. In this connection, the contact $LS_5$ is kept "on" for a period the solenoid SD is not excited.

When the number of sheets dispensed to the take-out opening 13 amounts to 11, the two high digits, or "11" in the register 3 coincides with the content in the counter 11 whereby a coincidence signal $PU_1$ is issued from the coincidence circuit 9. As a result of which, the relay $Aa$ in the distinction circuit 22 is excited through contacts $PU_{11}$ and $LS_{12}$ thereby to maintain its holding condition through a loop of $A_{2a}$, and furthermore the excitation of the relay A in the circuit 21 is removed by opening of the contact $A_{1a}$. Accordingly, the loop $y_1$ is opened, and another loop $y_2$ of

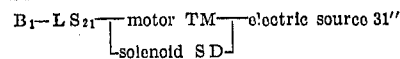

is in turn formed, whereby the locking condition of the drum 12 is relieved and is then turned again.

Therefore, when the 5,000-yen paper money MB arrives at the position of the dispensed money receptacle 13, a signal $LS_2$ is produced from the detection 14 and the loop $y_2$ in the circuit 23 is changed over to the loop Z of "contact $LS_{21}$ — $LS_5$ — relay R". Therefore, the drum 12 is stopped and locked, and the 5,000-yen paper moneys MB are taken out from the take-out opening 13.

In this connection, when a coincidence signal $PU_1$ is obtained, the content in the register 3 is shifted higher, so that the content on the second digit is "8". Accordingly, when only one sheet of the paper money MB is taken out from the take-out opening 13, a signal α is obtained from the coincidence circuit 9, as a result of which a relay Ba is excited through contacts $α_1$ and $LS_{22}$ in the circuit 22 thereby to maintain its holding condition, and the excitation of the relay B is removed.

Accordingly, a loop $y_3$ of

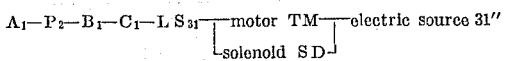

is formed in the circuit 23, and the loop $y_2$ is opened. As a result, the drum 12 is unlocked and then turned again.

Then, in the same manner as described above, when the 1,000-yen paper money arrives at the position of the take-out opening 13, a signal $LS_3$ is obtained and the loop $y_3$ of the circuit 23 is changed over to the loop Z of "contacts $LS_{31}$-$LS_5$ - relay R". Then, the 1,000-yen paper moneys MC are taken out from the take-out opening 13, and when the number of sheets of the thus taken out paper money MC amounts to three, a coincidence signal $PU_3$ is produced.

It should be noted in connection with this case that in practice when the output α is obtained upon taking-out of the 5,000-yen peper moneys, five pulses are issued to the coincidence circuit 9 from the counter 11, and when the 1,000-yen paper moneys are taken out, three pulses are furnished thereto, as a result of which the coincidence signal $PU_3$ is obtained in the circuit 9.

Upon production of the coincidence signal $PU_3$, the content on the second digit in the register 3 becomes "5", a relay Ca is excited to maintain its holding condition, and the excitation of the relay C is relieved. Therefore, a loop $y_4$ of

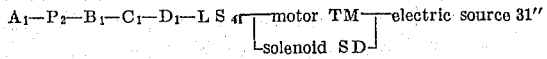

is formed in the circuit 23, and the drum 12 is therefore turned whereby the 500-yen paper money is taken out through the take-out opening.

When only one sheet of 500-yen paper money is taken out, a coincidence signal $PU_5$ is obtained from the coincidence circuit 9. In this case also, five pulses are fed to the circuit 9 from the counter 11 thereby to make comparison with the content in the register 3.

Now, upon obtaining the signal $PU_5$, a relay Da is excited thereby to maintain its holding condition, and the excitation of the relay D is removed, as a result of which a loop $y_5$ of "electric source 30 - contacts $A_1$-$P_2$-$B_1$-$C_1$-$D_1$," is formed in the circuit 23. The thus formed loop $y_5$ serves to excite the money dispensing motor M and a relay Q through the contact $PU_{51}$ in the circuit 24, and said motor M and the relay Q maintain their holding conditions through a loop of the contact $MS_1$ provided in connection with the motor M. In this case, when a coincidence signal $PU_4$ is obtained in the circuit 9 as described above, the content in the registers is shifted higher by this coincidence signal, whereby the content thus shifted coincides with the content "0" in the counter 11. As a result of which a signal $PU_5$ is obtained whereby the contact $PU_{51}$ is kept closed.

Accordingly, the amount of money, namely, 118,500 yen to be dispensed from the take- opening 13 is thus dispensed out with a minimum number of sheets thereof, that is, 11 sheets of 10,000-yen paper moneys, one sheet of 5,000-yen paper money, three sheets of 1,000-yen paper moneys and a sheet of 500-yen paper money.

A contact $Q_1$ of the relay Q is turned "off" due to the excitation of said relay Q, as a result of which the holding conditions of the relays Aa, Ba, Ca and Da are released. At the same time, a reset signal $Q_2$ is issued to the start cirucit 7, whereby a signal S cannot be obtained, as a result of which the contact $S_1$ is opened.

Figure 2:
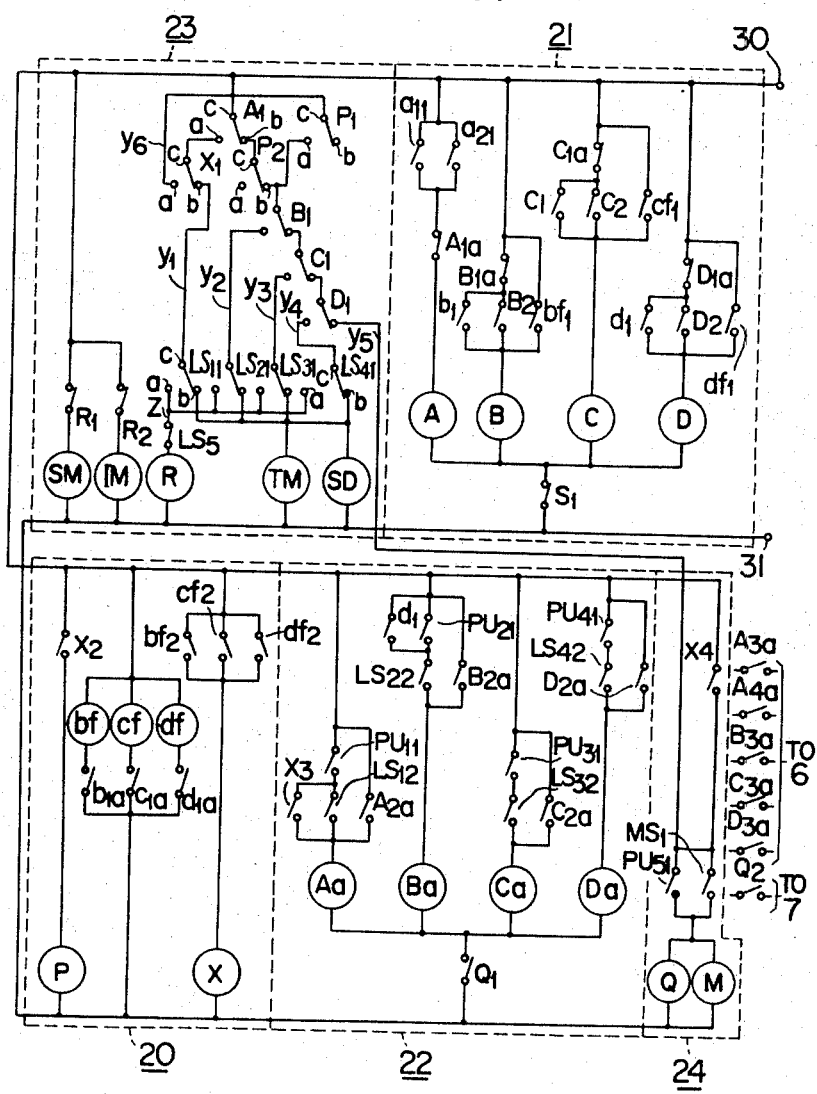
FIG. 2 is a circuit embodying a money dispensing driving circuit according to the present invention.

Under this condition, the excitation of the relay Q is removed due to the fact that the contact $MS_1$ is turned "off" when one rotation of the motor M is completed. The whole driving circuit is then restored to the conditions as shown in FIG. 2.

Thus, the amount of money displayed on the display unit 4 is dispensed out with the minimum number of sheets.

Described below is the case when 55 sheets of 5,000-yen paper money are dispensed out, that is, the case of dispensing money separated according to monetary kinds.

In this case, "55,000" is registered in the register 3 and is displayed on the display unit 4 by means of the 10-key means 1 and monetary kind push button means 2, respectively. At the same time, monetary kind signal $b_a$ is fed to the money dispensing driving circuit 5 thereby to close the contact $b_{1a}$ of the monetary kind input circuit 20, and the relay bf is excited through the thus closed contact $b_{1a}$. As a result, the relay X and accordingly the relay P are excited through the contact $bf_2$ of the relay bf. Furthermore, signals $a_1$ and $a_2$ are applied to the circuit 21 from the money check circuit 6, as a result of which contact $a_{11}$ and $a_{21}$ are closed.

Under this condition, upon application of a start signal S from the circuit 7, the relays A and B are excited through the contact $S_1$, and the relay B maintains its holding condition. Therefore, a loop $y_6$ of

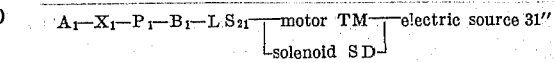

is formed in the circuit 23. Accordingly, the drum 12 is turned in the same way as described above, and 5,000-yen paper money MB is brought to the position of the take-in opening 13. At the same time, application of a signal $LS_2$ from the detector 14 is carried out, and the loop $y_6$ is therefore changed over to the loop Z of "contact $LS_{21}$-$LS_5$ - relay R".

As a result of which, 5,000-yen paper money MB is taken out to the take-out opening 13; however, when the number of sheets of the money MB reaches 55, the content in the counter 11 coincides with the content on the two adjacent to each other and including the most significant digit in the register 3 and a coincidence output $PU_2$ is produced from the coincidence circuit 9.

Therefore, the relay Ba is excited and maintains its holding condition, and the excitation of the relay B is removed, in the same manner as described above.

Upon removal of the excitation of the relay B, the loop $y_6$ is changed over to a loop of "contact $B_1$-$C_1$-$D_1$" in the circuit 23, whereby the money-dispensing motor M and the relay Q are excited through the contact $PU_{51}$ of the circuit 24. Therefore, after completion of dispensing the paper money taken out, the driving circuit is restored to the condition shown in FIG. 2, in the same manner as described aove. Thus, 55 sheets of 5,000-yen paper money are dispensed by depression of the 10-key 1 and monetary kind push button 2. In other words the operation of dispensing money according to monetary kinds is thus accomplished.

Described above is the case where "10,000", "5,000", "1,000" and "500" are employed as the monetary kinds, however it goes without saying that the number of monetary kinds and the number of sheets of paper money can be varied as required. Furthermore, the case where the content on the two digits adjacent to each other and including the most significant digit in the register 3 and that in the counter 11 are compared with each other for coincidence, has been described above. However, said comparison operation may be effected with any of the digits in the register 3.

While the principles of the present invention have been described above in connection with the paper-money dispensing machine, it is particularly understood that the present invention is not limited thereto but applicable to various types of money dispensing machines such as a hard money dispensing device.

With reference now to FIG. 3, there is shown a systematic diagram of a money selection control device according to the present invention, which comprises a money storage section 1, a money selection control section 2 and a money dispensing mechanism control section 3.

Said money storage section 1 has a plurality of storage elements, for instance, four flip-flops $FF_1$ to $FF_4$, which correspond to the number of monetary kinds. In the flip-flops $FF_1$ to $FF_4$ under the condition of reset, their outputs F are "L" while their outputs $\overline{F}$ are "H". When set-inputs $a_1$ to $a_4$ are applied to set-input terminals S from a function key (not shown), respectively, these flip-flops are set so that outputs F are "H" and outputs $\overline{F}$ are "L". Under this condition, when memory reset signals $EOT_1$ to $EOT_4$ separated according to monetary kinds or an all-reset signal AR is fed to reset terminals R, the flip-flops are reset.

The money selection control section 2 comprises a gate circuit G having four AND gates $G_1$ to $G_4$, and a diode matrix MX which is adapted to specify the order of operating gates $G_1$ to $G_4$. The matrix MX has horizontal lines $I_1$ to $I_4$ each of which is connected to one of the inputs of its respective gate on one hand and to an electric source Vcc having "H" level on the other hand, and vertical lines $m_1$ to $m_3$ which are connected to terminals $\overline{F}$ of the flip-flops $FF_1$ to $FF_3$ (with exception of $FF_4$), respectively. Diodes d are connected at matrix positions $(l_4 m_1)$, $(l_4 m_2)$, $(l_4 m_3)$, $(l_3 m_1)$, $(l_3 m_2)$ and $(l_2 m_1)$. The outputs "H" of the gates $G_1$ to $G_4$ of the gate circuit G are used respectively as reading-out signals $g_1$ to $g_4$, of the money to be dispensed.

The money dispensing mechanism drive control section 3 comprises four detection units $S_1$ to $S_4$ which are adapted to detect four position of a drum enclosing money according to monetary kinds, and a driving unit M which serves to drive the drum.

In this embodiment, a money dispensing mechanism (not shown) to be driven and controlled by the drive control section has a money-enclosing drum provided with a plurality of money-enclosing frames in which money to be dispensed selectively according to the monetary kinds is held, respectively. The money dispensing mechanism is so arranged that, when the drum is turned and a predetermined money-enclosing frame correctly reaches the position of a money dispensing section and stops there, money with the number of sheets which has been registered separately is taken out to the money dispensing section from the money dispensing frame mentioned immediately above.

The detection units of $S_1$ to $S_4$ receive the money reading-out signals $g_1$ to $g_4$ from the gates $G_1$ to $G_4$, through inputs of said detection units, each of said inputs being one of the inputs of its own detection unit. When drum position coincidence signals $b_1$ to $b_4$ are obtained at the other inputs, respectively, said detection units $S_1$ to $S_4$ produce outputs "H", respectively. In this connection, said drum position coincidence signals $b_1$ to $b_4$ are obtained when the money-enclosing frame is correctly brought to the position of the money dispensing section. The output "H" thus obtained in the detection units $S_1$ to $S_4$, respectively, are applied through an output OR gate OR to the money-enclosing drum driving unit M as a drum-setting completion signal "1". When a money dispensing start push botton PB is depressed without the signal "1" the driving unit M begins to device and turn the money-enclosing drum with the aid of a money dispensing start signal SR (adapted to start the operation of dispensing money) through the push button PB. Then, when the driving unit M comes to receive the signal "1", the money-enclosing drum is stopped. After this, when the driving unit M comes not to receive the signal "1", the money-enclosing drum is driven and turned again. The driving unit M is so arranged as described above.

Furthermore, when coincidence signal $b_1$ to $b_4$ are obtained at the inputs of the detection units $S_1$ to $S_4$ respectively, and it is completed to dispense money according to the monetary kinds corresponding to the thus obtained signals to the money dispensing section from the money-enclosing drum the previously mentioned monetary kind memory reset signals $EOT_1$ to $EOT_4$ are obtained in monetary-kind memory reset signal generating circuits provided separately.

In the case when it is intended to dispense several sheets of money for each of the available monetary kinds, signals $a_1$ to $a_4$ are fed to all the flip-flops $FF_1$ to $FF_4$ in the storage section 1 by means of a function key provided separately, respectively, whereby the flip-flops $FF_1$ to $FF_4$ are set up. As a result, the outputs F of the flip-flops $FF_1$ to $FF_4$ become "H" and then fed to the gates $G_1$ to $G_4$. At the same time, the outputs $\overline{F}$ of the flip-flops $FF_1$ to $FF_2$ becomes "L", whereby the levels of the horizontal lines $l_2$, $l_3$ and $l_4$ (except $l_1$) are reduced to "L" levels and the "H" level output of the horizontal line $l_1$ is supplied to the gate $G_1$.

Therefore, only the gate $G_1$ is opened, and an output $g_1$ is therefore fed to the detection unit $S_1$.

Under this condition, if the start push button PB is depressed, and then the driving unit M begins to turn the money-enclosing drum. Soon a coincidence signal $b_1$ is obtained in the detection unit $S_1$. At the same time, a completion signal "1" is received by the detection unit $S_1$, so that the driving unit M stops turning of the drum. Thus, only the predetermined number of sheets of money with the monetary kind corresponding to the coincidence signal $a_1$ is dispensed out. Upon completion of this money dispensing operation, the monetary-kind momory reset signal $EOT_1$ is obtained.

When the flip-flop $FF_1$ is reset by the thus obtained reset signal EOT, the output of the flip-flop $FF_1$ is changed or returned to "L". As a result of which the gate $G_1$ is closed and its output $g_1$ is therefore not produced out. Therefore, the signal "1" can be received by the driving unit, and so the driving unit M begins to turn the money-enclosing drum again.

On the other hand, since the flip-flop $FF_1$ is reset and its output $\overline{F}$ is returned to be "H", an output "H" is obtained on the horizontal line $l_2$ of the matrix, as a result of which the gate $G_2$ is opened. Thus the following operations are successively effected in the same manner as in the case where the gate $G_1$ is opened as described above. That is, when the gate $G_2$ is opened, money in a monetary kind corresponding to the signal $b_2$ is dispensed, the circuit $FF_2$ is reset, and when the gate $G_2$ is closed, the gate $G_3$ is opened at the same time, while the gate $G_3$ is opened and money in a monetary kind corresponding to the signal $b_3$. Furthermore, when the circuit $FF_3$ is reset and the gate $G_3$ is closed, the gate $G_4$ is opened at the same time and money in a monetary kind corresponding to the signal $b_4$ is dispensed, as a result of which the circuit $FF_4$ is reset, and the gate $G_4$ is closed.

Thus, all the money separated in accordance with all the monetary kinds are successively dispensed to the take-out opening in compliance with the order set up in the matrix MX. In this case, the ciircuits $FF_1$ to $FF_4$ are reset by all the reset signals AR obtained separately, and the whole money selection control device is restored back to its original conditions.

Only the case where set-inputs $a_1$ to $a_4$ are applied to all the flip-flop circuits $FF_1$ to $FF_4$ is revealed in the above explanation on the operation of the money selection control device; however, when some of the set-inputs are selected for application to respective circuits, only the money in the monetary kinds corresponding to the thus selected set inputs can be dispensed out.

For instance, when only the set inputs $a_1$ and $a_4$ are applied to respective circuits, the gate $G_4$ is opened by depression of the start push button switch PB whereby the money in the monetary kind corresponding to the set input $a_1$ is first dispensed out in the same manner as described before. Then, immediately after the circuit $FF_1$ is reset, the gate $G_4$ is opened whereby the money in the monetary kind corresponding to the set input $a_4$ is dispensed out.

As apparent from the above description, according to the present invention, money in monetary kinds corresponding to set-inputs applied to the money storage section 1 can be steadily and successively dispensed out in accordance with the predetermined order, and for this purpose particular devices or menas are not required. With the arrangement as described above with reference to the above-mentioned embodiment, the required operation is just to depress the money dispensing start push button PB only once, and accordingly it can be said that the operation is very simple.

Furthermore, the order of money to be dispensed in a plurality of monetary kinds can be changed as required. For instance, it can be accomplished by changing the connecting positions of the diodes in the order-designating diode matrix MX.

The case where there are four monetary kinds to be selected is explained in the above description; however the number of monetary kinds can be varied if the number of the flip-flop circuits and the number of the AND gates are varied with the number of monetary kinds.

In addition, the gate circuit G arranged with inclusion of the AND circuits is disclosed in the above description, however it is apparent that the AND circuits may be replaced with NAND circuits.

Furthermore, it is revealed in the above description that the set-inputs applied to the storage section 1 is obtained by means of the function key, however it is preferable to obtain the set-inputs from the memory check circuit in the case of dispensing money with a minimum number of sheets.

We claim:

1. A driving system for dispensing money in an automatic money dispensing machine, which comprises: indication means for indicating the amount of money to be dispensed and producing an indication signal in correspondence thereto; storage means for storing said indication signal produced by said indication means; a money storage section comprising money storing portions each containing money of a respective monetary kind; a money dispensing means comprising a selection section for selecting the required storing portion of said money storage section, and a money dispensing section for dispensing the money form said selected storing portion; a monetary kind selection control means for successively selecting the monetary kinds to be dispensed from the storage content of said storage means; a driving means for positioning said money dispensing section of said money dispensing means at a money storing portion selected by said selection section of said money dispensing means, and a driving control section disposed in interworking relationship with said storage means, said money dispensing means, said monetary kind selection control means, and said driving section, in such a manner, that the amount of money to be dispensed by said dispensing means is controlled in accordance with the storage content of said storage means, and said driving control section is controlled by said monetary kind selection control means in accordance with the selection thereof thereby to control said driving section of said dispensing means.

2. A driving system for dispensing money in an automatic money dispensing machine: which comprises an indication means for indicating the amount of money to be dispensed and producing an indication signal in correspondence thereto; storage means for storing said indication signal produced by said indication means; a money storage section comprising a plurality of money storing portions each containing money of a respective monetary kind; a single money dispensing means for dispensing money from at least one of said money storing portions of said money storage section so that either money is dispensed in one monetary kind or in a combination of plural monetary kinds respectively; a comparison circuit for comparing, with respect to each monetary kind, the money dispensed from the money dispensing means with the money amount corresponding to the indication signal stored in said storage means so that a coincidence signal is produced when the compared amounts coincide with each other with respect to each monetary kind; a monetary kind selection control means operating in response to said coincidence signal for successively selecting the monetary kind to be dispensed; a driving means for positioning said single money dispensing means at a money storing portion of said money storage section, said portion corresponding to the monetary kind selected by said monetary kind selection control means; and a driving control means disposed in interworking relationship with said money dispensing means and said driving means so as to stop the dispensing operation of said dispensing means and to operate said driving means in accordance with the control signal from said monetary kind selection control means thereby to position said dispensing means at another one of said storing portions of said money storing section, said storing portion corresponding to the next monetary kind to be dispensed.

3. A driving system as claimed in claim 1, said system being provided with a plurality of first switching means and a plurality of second switching means, said plurality of first switching means each being respectively operated by signals corresponding to each respective monetary kind and produced in accordance with the indication signals stored in the storage means, and said plurality of second switching means being operated by money dispensing positional signals with respect to each respective monetary kind correspoonding to the operated first switching means, and normally closed contact sides of said first switching means being connected to one another in cascade and normally open contact sides of said first switching means being connected to corresponding contact sides of said second switching means, thereby to produce signals through respective loops on the normally open contact sides for driving the money dispensing means.

* * * * *